Patented Oct. 17, 1933

1,930,472

UNITED STATES PATENT OFFICE 1,930,472

MANUFACTURE OF CELLULOSE DERIVATIVES

Henry Dreyfus, London, England

No Drawing. Original Application November 18, 1930, Serial No. 496,572, and in Great Britain December 18, 1929. Divided and this application August 19, 1932. Serial No. 629,492

10 Claims. (Cl. 260—152)

This application is a divisional application from my U. S. application S. No. 496,572 filed 18th November, 1930, which is a continuation in part of my prior U. S. application S. No. 492,363 filed 30th October, 1930.

The said U. S. application S. No. 492,363 describes inter alia the manufacture of new halogen containing cellulose ethers by replacing the hydroxy groups of hydroxy-containing cellulose ethers by halogen atoms, e. g. by treatment with thionyl chloride. The present invention is concerned with new methods for the preparation of these new halogen-containing cellulose ethers.

According to the present invention halogen-containing cellulose ethers are prepared by reacting on cellulose or cellulose containing materials with reactants containing an etherifying atom or group and in addition at least one halogen atom. In particular I employ bodies containing an alkylene oxide group and a halogen atom, such as epichlorhydrin, or its homologues, such as brom-butylene oxide. In my U. S. Patent No. 1,502,379 I described a process for preparing ethers of cellulose from epichlorhydrin by causing the epichlorhydrin to react with the cellulose in presence of caustic soda. In this process the chlorine acts as the etherifying group, combining with hydrogen of the cellulose and splitting away as hydrochloric acid. I have now found that if the epichlorhydrin is caused to react in the substantial absence of alkali, halogenated cellulose ethers are produced. To obtain a high ether content the etherification may be conducted in two or more stages and use may be made of catalysts, for example copper powder, copper hydroxides or salts, to accelerate or further the etherification.

As starting materials cotton or other cellulosic materials or near conversion products thereof, e. g. the regenerated type of artificial fibre or wood pulps, and preferably chemical wood pulps such as sulphite, sulphate or soda pulps containing substantially no lignin, pentosan, resin or like constituents may be used. Such cellulosic materials may be subjected to a pretreatment prior to the etherification. Such pretreatments may take the form of a simple treatment with organic acids, for example acetic acid or formic acid or a treatment with caustic or other alkali, or a treatment with mineral acids, for example sulphuric acid or hydrochloric acid or a combination of any of the above pretreatments may be applied. Mineral or organic acids may be, but need not be, substantially removed prior to the etherification and any strong alkali should also be substantially removed, for example by washing.

As described in my U. S. application S. No. 492,363 previously referred to, the halogen-containing ethers of cellulose may be treated with ammonia or with aliphatic, aromatic or other organic amines to obtain amino-ethers of cellulose having an affinity for acid dyestuffs. For instance the halogen-containing cellulose ethers may be treated with ammonia, preferably under pressure, or may be boiled with an aliphatic or aromatic amine in presence of a solvent or non-solvent diluent for the cellulose ether treated. For example, the halogen-containing ether may be heated in a closed container with excess of concentrated ammonia solution at a temperature of 100 to 110° C. Alternatively the halogen-containing cellulose ether may be heated with excess of aniline under a reflux condenser for half an hour during which the mixture is boiled, after which the mixture is allowed to cool and the cellulose derivative is precipitated and washed with water.

The following example shows the best method known to me for carrying the invention into effect, but it is not to be considered as limiting the invention in any way:—

Example

Wood pulp which has been treated with alkali and with formic or acetic acid according to my U. S. Patent No. 1,711,110 or cotton linters which have been treated with liquid or vaporous formic or acetic acid according to my French Patent No. 565,654 or U. S. Patent No. 1,831,101 or with a mixture of acetic acid with sulphuric or hydrochloric acid is well washed, first with aqueous methylated spirit and then with absolute alcohol or methylated spirit. It is then allowed to steep overnight in excess of epichlorhydrin. The steeped mass is then gently refluxed with about 6–10 times its weight of epichlorhydrin for 4–8 hours or until a gain in weight corresponding with the formation of the required ether is obtained. Thus the cellulose may undergo an increase in weight of 100–170%. The higher etherification products are soluble in chloroform-alcohol.

What I claim and desire to secure by Letters Patent is:—

1. Process for the production of cellulose derivatives, comprising treating cellulose in the substantial absence of alkali with an etherifying agent containing in addition to the etherifying radicle a halogen atom of lower reactivity than said etherifying radicle, so that a halogen-containing cellulose ether is produced.

2. Process for the production of cellulose derivatives, comprising treating cellulose in the substantial absence of alkali with an etherifying agent containing an alkylene oxide group and a halogen atom so that a halogen-containing cellulose ether is produced.

3. Process for the production of cellulose derivatives comprising pretreating cellulose with acid reagents and treating the products in the substantial absence of alkali with an etherifying agent containing an alkylene oxide group and a halogen atom so that a halogen-containing cellulose ether is produced.

4. Process for the production of cellulose derivatives comprising treating cellulose with epichlorhydrin in the absence of alkali so that a halogen-containing cellulose ether is produced.

5. Process for the production of cellulose derivatives comprising pretreating cellulosic material with acid reagents and then treating the product with epichlorhydrin in the absence of alkali so that a halogen-containing cellulose ether is produced.

6. Halogen hydroxy alkyl ethers of cellulose.

7. Chlorhydroxy propyl ether of cellulose.

8. Process for the production of nitrogen-containing cellulose derivatives, comprising treating cellulose in the substantial absence of alkali with an etherifying agent containing in addition to the etherifying radicle a halogen atom of lower reactivity than said etherifying radicle, so that a halogen-containing cellulose ether is produced, and then reacting the halogen-containing ether with a compound selected from the group consisting of ammonia and organic amines.

9. Process for the production of nitrogen-containing cellulose derivatives, comprising treating cellulose in substantial absence of alkali with an etherifying agent containing an alkylene oxide group and a halogen atom, so that a halogen-containing cellulose ether is produced, and then reacting the halogen-containing ether with a compound selected from the group consisting of ammonia and organic amines.

10. Process for the production of nitrogen-containing cellulose derivatives, comprising treating cellulose with epichlorhydrin in the absence of alkali so that a halogen-containing cellulose ether is produced, and then reacting the halogen-containing ether with a compound selected from the group consisting of ammonia and organic amines.

HENRY DREYFUS.